E. H. KELLY, DEC'D.
W. D. PHELPS, TEMPORARY ADMINISTRATOR.
AIRSHIP.
APPLICATION FILED DEC. 18, 1909.
1,044,466.
Patented Nov. 12, 1912.
3 SHEETS—SHEET 3.
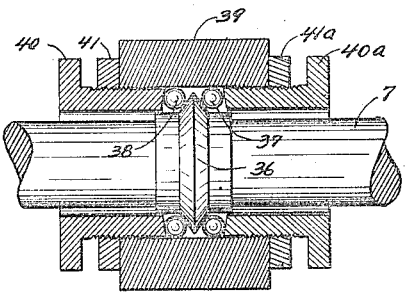
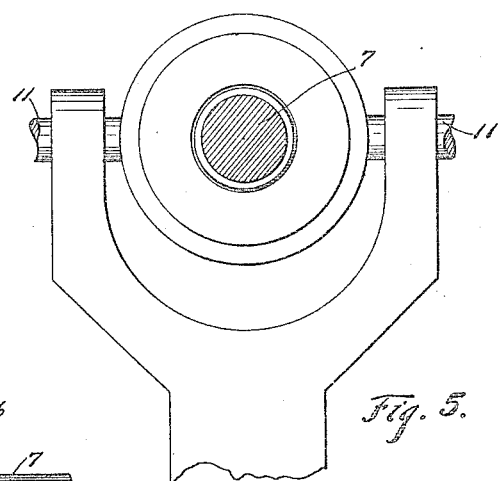
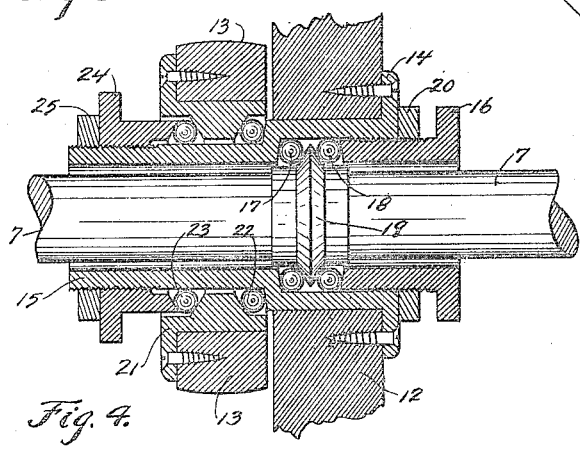
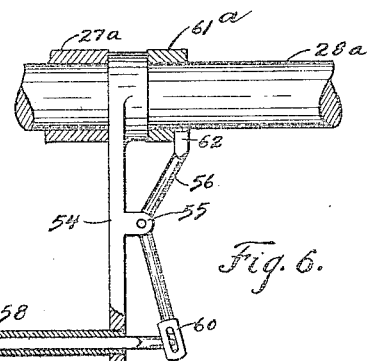
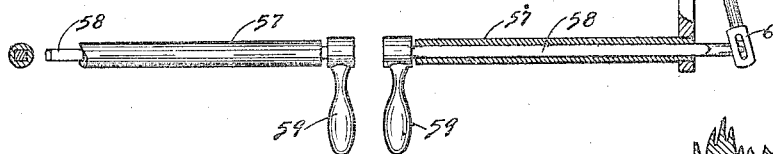
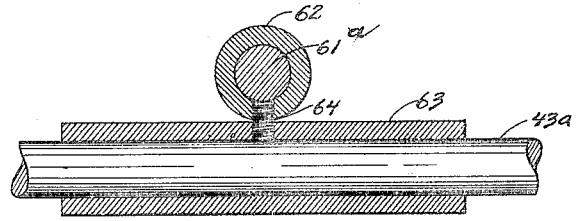
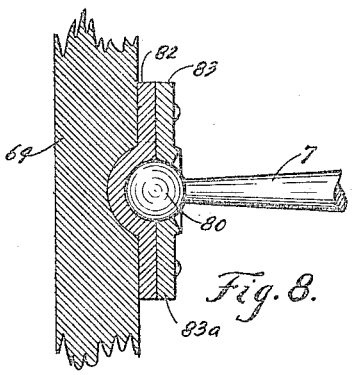
WITNESSES:
INVENTOR
Eugene H. Kelly
BY J. W. M. Ellis
ATTORNEY.

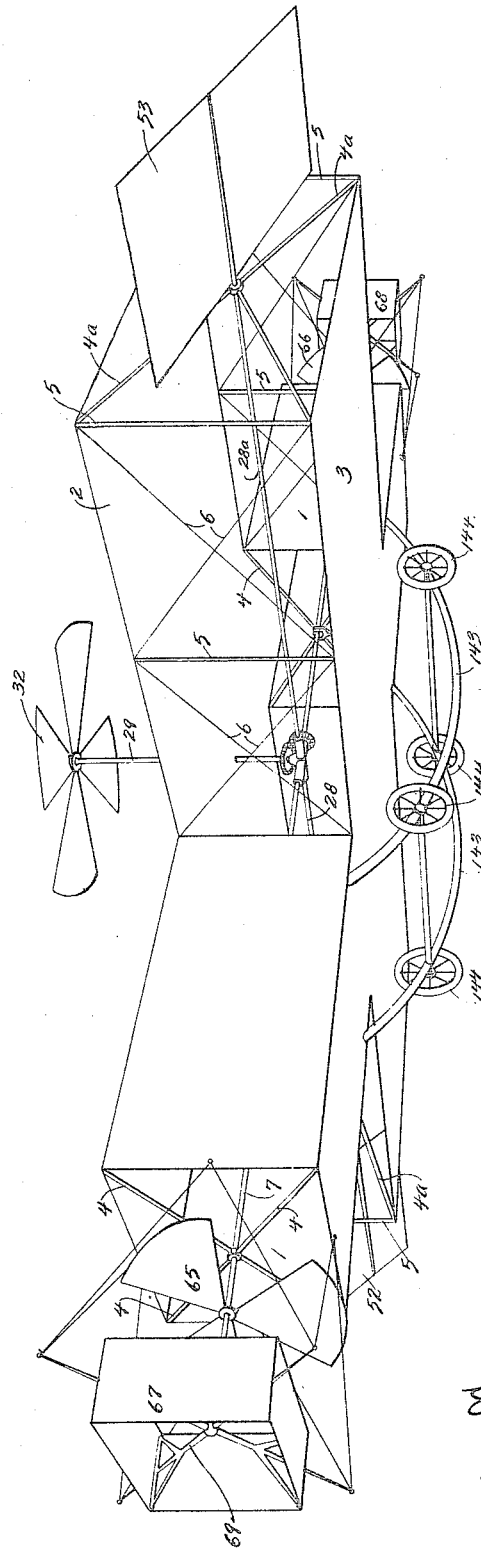

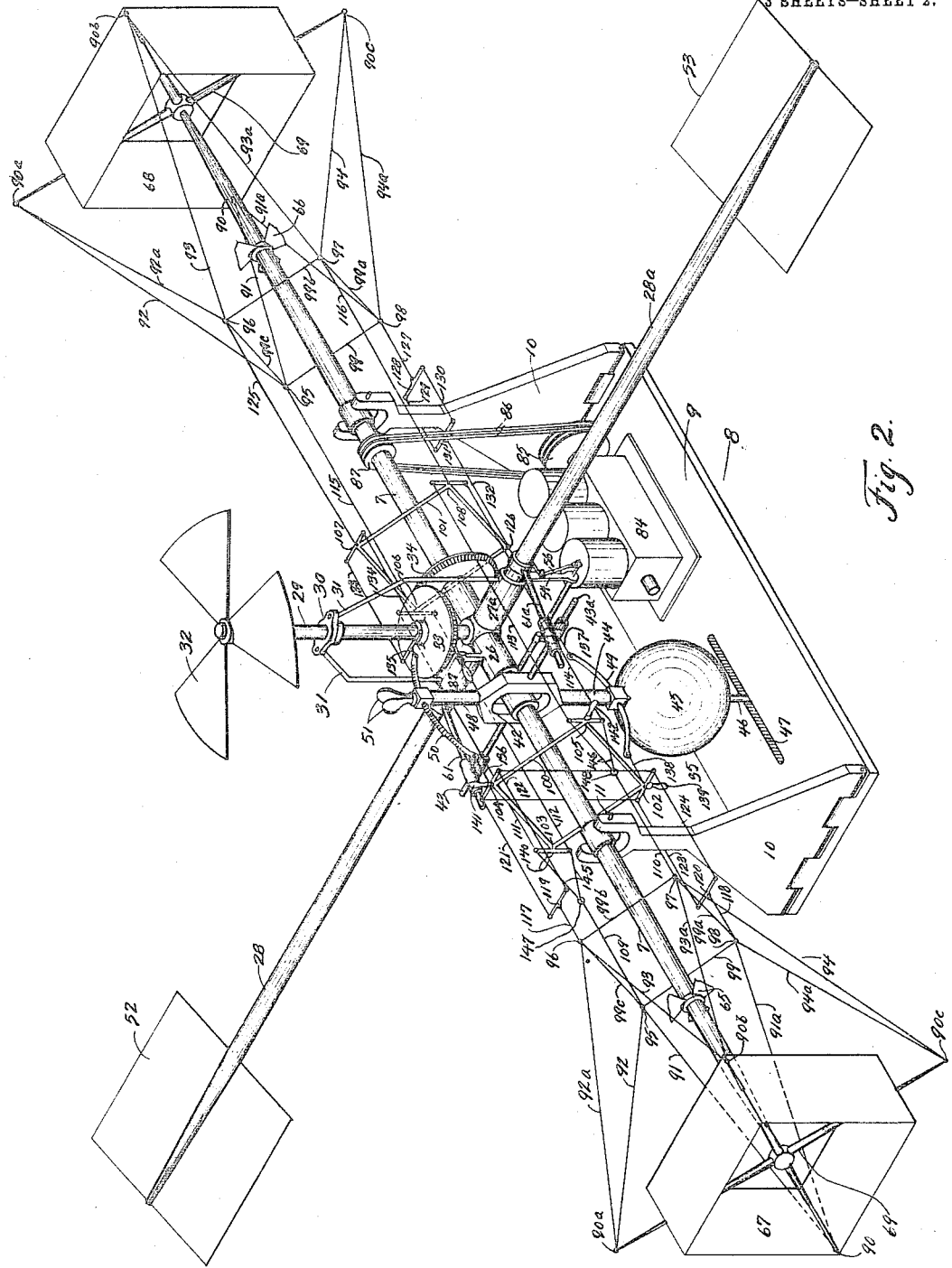

UNITED STATES PATENT OFFICE.

EUGENE H. KELLY, OF BUFFALO, NEW YORK; W. DARWIN PHELPS TEMPORARY ADMINISTRATOR OF SAID KELLY, DECEASED.

AIRSHIP.

1,044,466.

Specification of Letters Patent.

Patented Nov. 12, 1912.

Application filed December 18, 1909. Serial No. 533,901.

*To all whom it may concern:*

Be it known that I, EUGENE H. KELLY, a citizen of the United States of America, residing at Buffalo, county of Erie, State of New York, have invented certain new and useful Improvements in Airships, of which the following is a full, clear, and exact description.

My invention relates to airships and those of the bi-plane type in particular.

The main object of my invention has been to provide an airship, which, when under flight, shall be entirely automatic in its action and control and one which can also be operated manually if desired.

Some of the other objects are: to provide an airship with rudders which shall be universal in their action, i. e., rudders which shall act in any and every direction; also to provide an airship which when ascending shall not require a long flying start.

Many other merits of my invention will be apparent to those skilled in the art.

In the drawings which form part of this specification like figures of reference indicate corresponding parts in the different views in which:

Figure 1 is a general perspective view of my airship. Fig. 2 is a perspective showing the mechanism of the same. Fig. 3 is a sectional view taken on the center line of one of the pendulum bearings. Fig. 4 is a sectional view taken on the center line of one of the main bearings and one of the platform bearings. Fig. 5 is a front view of one of the platform hangers. Fig. 6 shows a portion of the plano rudder manual operating means. Fig. 7 shows a section of the connection between the plano rudder lever and the automatic operating means. Fig. 8 is a sectional view taken on the center line of the box rudder bearings and shows one of the ball joints by which the same are supported.

1 (Fig. 1) represents the square box shape body of my airship which extends longitudinally with the line of flight. Although a square box body is shown, obviously the vertical sides of the body may be left off if desired. Extending on either side of the central portion of the top and bottom of the body 1 are horizontal planes 2 and 3 thus making the plan of the general contour of the ship appear like a Maltese cross. Supports 4 extend from diagonally opposite corners of the body 1, at any suitable number of places and bearing supports are formed at the junction of the supports 4. Diagonal supports 4ᵃ and vertical supports 5 brace and hold the horizontal planes in their proper positions. Wire stays 6 may be fastened diagonally from one vertical brace to the other to further increase the rigidity of the airship.

Extending longitudinally through the center of the body 1 is the main shaft 7 which is provided preferably with ball bearings supported at the junction of the diagonal supports 4. A platform 8 may be swung either mediately or immediately from the shaft 7 and comprises a base 9 and two hinged sides 10. The upper end of each hinged side is bifurcated and pivotally mounted upon pins 11 (Figs. 2 and 5). The bearings which support the platform are shown in Fig. 2 in a conventional manner only, a detailed sectional view of one of the bearings being shown in Fig. 4 where it will be seen that the bearing for the platform is combined with the main shaft bearing.

In Fig. 4, 12 represents a section of one of the bosses at the junction of the support 4. 13 is a section of the ring in which are diametrically disposed the pins 11. An annular flanged ball ring 14 extends through the boss 12 and the end 15, which is of smaller diameter, projects for some distance beyond the face of the boss 12. The interior of the larger portion of the ball ring 14 together with the ring 16, which is screw-threaded to the same, form ball cups for the series of balls 17 and 18. A cone ring 19 is secured to the shaft 7 and forms a cone for both series of balls. The ring 16 provides adjustment for this bearing and is locked in position by the lock ring 20. A flanged annular cone ring 21 extends through the ring 13 and is suitably secured thereto.

The cone ring 21 forms a cone for the series of balls 22 and 23 which are disposed in ball cups formed by the smaller portion of the cup ring 14 and the ring 24 which is screw-threaded onto the end 15 of the said cup ring and which provides means for adjusting the last mentioned series of balls. A lock ring 25 also screws on the end 15 of the cup ring 14 and serves to lock the ring 24 in position.

A bearing member 26 (Fig. 2) is rotatably mounted at the exact center of gravity upon the shaft 7. This bearing member is provided with two right angled cylindrical projections 27 and 27ª in which the inner ends of the shafts 28 and 28ª are disposed. Rotatably supported at the center of the bearing member is a vertical shaft 29 the upper end of which is supported by the bearing 30, this bearing being preferably carried by the stays 31 as shown. To the upper end of this vertical shaft 29 is secured a helicopter screw propeller 32 and near the bottom of the said shaft is disposed a miter gear 33 which meshes with a miter gear 34 secured on the shaft 7. Means are provided preferably, between the miter gear 33 and the shaft 29 whereby the helicopter propeller 32 may be thrown into or out of action at the will of the operator. The miter gear drive shown is only one of the many forms of transmissions which might be employed to drive the helicopter propeller 32.

At some convenient location, preferably in front and near the bearing member 26 is suspended my automatic pendulum 35 by which all the ship's rudders are automatically manipulated. In Fig. 3 is shown a sectional view of the bearing from which the pendulum is suspended. In that figure 36 is an annular cone ring which is secured to the shaft 7 in any suitable way. The cone ring 36 forms the cone for the two series of balls 37 and 38 and surrounding which is the bearing ring 39. This bearing ring is interiorly screw-threaded at each end and has screwed therein rings 40 and 40ª the inner faces of which bear against the balls 37 and 38 and provide adjustment therefor. Lock rings 41 and 41ª are screw-threaded over the rings 40 and 40ª and serve to lock the same in their proper position.

42 (Fig. 2) is the pivotal member of the pendulum which surrounds the bearing ring 39 and is pivotally mounted upon the pivot rods 43 and 43ª which extend for considerable distance beyond the pendulum. Suspended from the pivotal member 42 by a rod 44, is a tank 45 which is preferably of a spherical form. The tank 45 may be used for the storage of fuel or water for the engines and a pipe may be attached thereto for draining purposes and when so arranged I prefer to pass the pipes through the slot 47 in the base of the platform. Obviously the tank 45 may be dispensed with as a bob or weight for the pendulum if desired and the rod 46, which extends from the pendulum rod 44 may be pivotally secured to the base 9 of the platform 8, thus utilizing the platform with its passengers, engine and accessories, as the bob or weight for the pendulum. By this arrangement more platform space is made available. A rod 48 rises vertically from the pivotal member of the pendulum and is of equal length to the rod 44. Passing through the ends of the rods 44 and 48 which are farthest from the pivot member and slidably disposed therein are arc rods 49 and 50. The arc rod 50 is provided with teeth in its upper side and a ratchet pawl (not shown) is disposed above these teeth and is operated by means of the handle 51 whereby the arc rod 50 may be set at different relative positions with the pendulum and made to travel therewith, or may be operated independently by manual means.

The shafts 28 and 28ª hereinbefore referred to, run centrally between the horizontal planes 2 and 3 and are supported near their outer ends at the junction of the supports 4ª. Secured to the outer ends of the shafts 28 and 28ª are plano rudders 52 and 53 respectively.

Near the inner ends of the shafts 28 and 28ª and close to the cylindrical projections 27 and 27ª of the bearing member 26 are secured in a rigid manner the levers 54 (Fig. 6). The levers 54 are provided with lugs 55 between which the double-ended bent levers 56 are pivotally mounted. The lower ends of the levers 54 are provided with sleeves 57 which are secured thereto in a rigid manner and which extend inwardly for a considerable distance. The apertures through the sleeves 57 are preferably square in conformation and have slidably disposed therein square rods 58. To the inner ends of rods 58 are secured handles 59 and the outer ends are in engagement with the slotted ends 60 of the double-ended bent levers 56.

Rotatably mounted next to the levers 54 upon the shafts 28 and 28ª are levers 61 and 61ª the hub of each of which (shown in section in Fig. 6) is provided with an indentation in which the upper end 62 of the lever 56 fits, whereby the shafts 28 and 28ª may be locked with the levers 61 and 61ª operated independently by manual means.

The arms of the levers 61 and 61ª are cylindrical and are of sufficient length to extend for some distance past the pivot rods 43 and 43ª to which they are connected, a section of such connectors being shown in Fig. 7, where it will be seen that the sleeves 62 and 63 are slidably and rotatably disposed upon the arms of the levers 61 and 61ª and the rods 43 and 43ª respectively. Two of these sleeves are placed one on the other at right angles and are connected at their center preferably by means of the screw-threaded studs 64 thus providing pivotal connections between the sleeves 62 and 63.

84 represents the hydrocarbon engine which furnishes motive power for my airship. This engine is mounted on the exact center line upon the base 9 of the platform 8 and is belted from the driving pulley 85 to the pulley 87 fixed on the shaft 7 preferably by means of a plurality of belts 86.

Screw propellers 65 and 66 for convenience shown broken off in Fig. 2, are secured near the front and rear of the ship to the shaft 7 and form the main propelling means for my airship.

To the two extreme ends of the ship are secured my box rudders 67 and 68 which are made of any light, tough material stretched upon frames 69. The connection between one of the shaft ends and one of the rudders 67 and 68 is clearly shown in Fig. 8 where it will be seen that the end 80 of the shaft 7 is spherical and fits into a socket plate which is secured by any suitable means to the center of the frame 69. Clamping plates 83 and 83$^a$ are detachably fastened to the socket plate 82 and serve to keep the spherical end 80 of the shaft in its place.

The diagonal supports of the frame 69 project through the corners of the box rudders 67 and 68 and are provided at their extreme outer ends with pivotal points 90, 90$^a$, 90$^b$ and 90$^c$. To each of these points are connected two wires which run to points in a vertical plane at some place along the shaft 7 but inside the propellers 65 and 66—thus points 90, have wires 91 and 91$^a$ connected to each, points 90$^a$, have wires 92 and 92$^a$, points 90$^b$, have wires 93 and 93$^a$ and points 90$^c$, have wires 94 and 94$^a$. Of these wires 91 and 92 converge at junction points 95; wires 92$^a$ and 93 at points 96; wires 93$^a$ and 94 at points 97; wires 94$^a$ and 91$^a$ at points 98. The junction points 95, 96, 97 and 98 are held in their proper positions by the wires 99, 99$^a$, 99$^b$ and 99$^c$.

100 and 101 are frames which are placed in a diagonal position about the shaft 7. The frame 100 which is at the front end of the ship is provided at each of its corners 102, 103, 104 and 105 with traverses, and the frame 101 is also provided at the corners 106, 107 and 108 with traverses as shown.

To the junction points 95 and 97 at the front end of the ship are secured respectively, wires 109 and 110 which are pivotally connected to the ends 103 and 105 of the frame 100 by means of wires 145 and 146 respectively each pair of which converge at junction points 147 and 148 respectively. Connecting the traverse at the end 103 of the frame 100 with the traverse at the end 106 of the frame 101, are wires 111 and 112 and in a like manner wires 113 and 114 connect the traverses at the ends 105 and 108 of the frames 100 and 101 respectively. Pivotally connected to the ends 106 and 108 of the frame 101 are wires 115 and 116 the other ends of which are secured to the junction points 95 and 97 respectively at the rear end of the ship.

Junction points 96 and 98 at the front end of the ship are connected by wires 117 and 118 to the traverses 119 and 120 respectively, and these traverses are connected to the traverses on the ends 104 and 102 of the frame 100 by means of wires 121 and 122; 123 and 124. Junction point 96 at the rear of the ship is preferably connected direct to the end 107 of the frame 101 by means of the wire 125 and junction point 98 is connected to the end 126 of the frame 101 by means of the wire 127, traverse 128, wires 129 and 130, traverse 131 and wire 132.

The traverse at the end 107 of the frame 101 is connected by wires 133 and 134 to the traverse 135 which is pivotally secured to the rear end of the arc rod 50. The front end of the arc rod 50 is connected to the end 104 of the frame 100 by means of the wire 136. The end 126 of the frame 101 is connected to the rear end of the arc rod 49 by means of the wire 137 and the front end of the said arc rod is connected by the wire 138 to the end 102 of the frame 100. At each corner of the frame 100 are provided handles 139, 140, 141 and 142 by which the box rudders may be manually operated.

Rockers 143 to which wheels 144 are rotatably secured, are secured to the base of the ship to support the same when upon the ground.

When it is desired to operate my airship, the arc rod 50 is thrown out of engagement with the pendulum by releasing the handles 51, and the handle 139 of the frame 100 is then moved forward and, as both rudders 67 and 68 are connected together and to the frame 100 by means hereinbefore mentioned, the upper part of the rudders will be tipped backward and the lower part forward, thus steering the ship in an upward direction. The helicopter propeller 32 is thrown into engagement and the engine 84 started, whereupon the ship will make a smooth forward flight and at the same time a rapid ascent. After the ship has reached the desired altitude, the helicopter propeller is thrown out of action and the rudders 67 and 68 manually set so that the ship will pursue generally a horizontal course, whereupon the notched arc rod 50 is engaged with the pendulum, after which all steering in a plane vertical to the line of flight is entirely automatic. All steering in a plane horizontal to the line of flight is accomplished by simply manipulating the handles 142 or 140 forward or backward without any interference with the pendulum.

Owing to the plurality of notches on the arc rod 50 the rudders 67 and 68 may be set and automatically operated by the pendulum so as to cause the ship to gradually ascend or descend as desired.

It is practically impossible for my airship to overturn. The pendulum which is mounted upon the pivotal pins 43 and 43ª, always remains perpendicular and therefore the pivotal pins always level. Now should the ship, for any reason, tend to tip to one side it will easily be seen that there will be a relative movement between the pivotal rods 43 and 43ª and the arms of the levers 61 and 61ª, i. e., the arms of the levers 61 and 61ª actuated by the pivotal rods 43 and 43ª respectively, will be revolved, to a degree equal to the tip of the ship, and in opposite directions. This will cause the plano rudders 52 and 53 to be tilted oppositely and thus restore the equipoise of the ship. This balancing is entirely automatic and sensitive to the least tilting of the ship thus producing a very smooth operating and effective device.

The plano rudders also provide an effective air brake. When desiring to make a quick stop or in the case of emergency, it is desired to so use the plano rudders, the handles 59 (Fig. 6) are pressed toward each other, which action releases the upper ends 62 of the bent levers 56 from the slots in the levers 61 and 61ª whereupon the levers 54 may be revolved free of the said levers 61 and 61ª and the full area of the plano rudders may be presented at right angles to the line of travel and square of wind.

Obviously some modifications of the details herein shown and described may be made without departing from the spirit of my invention and I do not wish to be limited to the exact embodiment herein shown and described.

What I claim is:

1. An airship comprising one or more horizontal planes extending at right angles to the line of flight, a main shaft running centrally across said horizontal planes and parallel to the line of flight, propellers mounted at the front and rear of said shaft, a source of power, rudders at the front and rear of said shaft, and automatic means for governing said rudders.

2. An airship comprising one or more horizontal planes extending at right angles to the line of flight, a main shaft running centrally across said horizontal planes and parallel to the line of flight, propellers mounted at the front and rear of said shaft, means for universally mounting said rudders on said shaft, and automatic means for governing said rudders.

3. An airship comprising one or more horizontal planes extending at right angles to the line of flight, a main shaft running centrally across said horizontal planes and parallel to the line of flight, a bearing member rotatably mounted at the center of said main shaft, a vertical shaft supported by said bearing member, a helicopter propeller mounted upon said vertical shaft, propellers mounted upon said main shaft, rudders at the front and rear of said main shaft, and automatic means for governing said rudders.

4. An airship comprising one or more horizontal planes extending at right angles to the line of flight, a main shaft running centrally across said horizontal planes and parallel to the line of flight, a bearing member rotatably mounted at the center of said main shaft, a vertical shaft supported by said bearing member, a helicopter propeller mounted upon said vertical shaft, screw propellers on said main shaft, a source of power, transverse shafts running parallel with said horizontal planes and rotatably supported by said bearing member, one at each end of said bearing member, plano rudders mounted on the outer end of each of said transverse shafts, box rudders, means for universally connecting said box rudders to said main shaft, and means for automatically operating said plano and said box rudders.

5. An airship comprising one or more horizontal planes extending at right angles to the line of flight, a main shaft running centrally across said horizontal planes and parallel to the line of flight, propellers mounted at the front and rear of said shaft, a source of power, box rudders at the front and rear of said main shaft, a pendulum, means for pivotally mounting said pendulum on said main shaft, automatically operated means for connecting said pendulum with said box rudders, and manually operated means for connecting said pendulum to said box rudders and independent of said automatic means.

6. An airship comprising one or more horizontal planes extending at right angles to the line of flight, a main shaft running centrally across said horizontal planes and parallel to the line of flight, propellers mounted at the front and rear of said main shaft, a source of power, box rudders at the front and rear of said shaft, a bearing member rotatably mounted at the center of said main shaft, transverse shafts running parallel with said horizontal planes and rotatably mounted in said bearing member, plano rudders at the outer end of each of said transverse shafts, a pendulum pivotally mounted on said main shaft, automatically operated means connecting said pendulum with said plano rudders, manually operated means connecting said pendulum with said plano rudders, box rudders universally mounted on said main shaft, automatically operated means connecting said pendulum with said box rudders, and manually operated means connecting said pendulum with said box rudders, whereby the ship is entirely automatic in its operation or may be manually operated when required independent of said automatic operation.

7. An airship comprising one or more horizontal planes extending at right angles to the line of flight, a main shaft running centrally across said horizontal planes and parallel to the line of flight, propellers mounted at the front and rear of said main shaft, a source of power, box rudders at the front and rear of said shaft, a bearing member rotatably mounted at the center of said main shaft, a vertical shaft supported by said bearing member, a helicopter propeller mounted upon said vertical shaft, transverse shafts running parallel with said horizontal planes and rotatably mounted in said bearing member, plano rudders at the outer end of each of said transverse shafts, a pendulum pivotally mounted on said main shaft, automatically operated means connecting said pendulum with said plano rudders, manually operated means connecting said pendulum with said plano rudders, box rudders universally mounted on said main shaft, automatically operated means connecting said pendulum with said box rudders, and manually operated means connecting said pendulum with said box rudders, whereby the ship is entirely automatic in its operation or may be manually operated when required independent of said automatic operation.

8. An airship comprising one or more horizontal planes extending at right angles to the line of flight, a main shaft running centrally across said horizontal planes and parallel to the line of flight, propellers mounted at the front and rear of said main shaft, a source of power, a platform pivotally mounted beneath said main shaft, box rudders at the front and rear of said main shaft, a bearing member rotatably mounted at the center of said main shaft, transverse shafts running parallel with said horizontal planes and rotatably mounted in said bearing member, plano rudders at the outer end of each of said transverse shafts, a pendulum pivotally mounted on said main shaft, automatically operated means connecting said pendulum with said plano rudders, manually operated means connecting said pendulum with said plano rudders, box rudders universally mounted on said main shaft, automatically operated means connecting said pendulum with said box rudders, and manually operated means connecting said pendulum with said box rudders, whereby the ship is entirely automatic in its operation or may be manually operated when required independent of said automatic operation.

9. In an airship comprising one or more horizontal planes extending at right angles to the line of flight, a main shaft running centrally across said horizontal planes and parallel to the line of flight, propellers mounted at the front and rear of said shaft, a source of power, box rudders at the front and rear of said main shaft, a platform universally suspended from said main shaft, a pendulum, means for universally mounting said pendulum on said main shaft, means for pivotally connecting the lower end of said pendulum to said platform, automatically operated means for connecting said pendulum with said box rudders, and manually operated means for connecting said pendulum to said box rudders and independent of said automatic means.

10. In an airship comprising two or more horizontal planes extending at right angles to the line of flight, a main shaft running centrally across said horizontal planes and parallel to the line of flight, propellers mounted at the front and rear of said main shaft, a source of power, a platform universally mounted beneath said main shaft, box rudders at the front and rear of said main shaft, a bearing member rotatably mounted at the center of said main shaft, transverse shafts running parallel with said horizontal planes and rotatably mounted in said bearing member, plano rudders at the outer end of each of said transverse shafts, a pendulum pivotally mounted on said main shaft, and pivotally secured at its lower end to the said platform, automatically operated means connecting said pendulum with said plano rudders, manually operated means connecting said pendulum with said plano rudders, box rudders universally mounted on said main shaft, automatically operated means connecting said pendulum with said box rudders, and manually operated means connecting said pendulum with said box rudders, whereby the ship is entirely automatic in its operation or may be manually operated when required independent of said automatic operation.

11. In an airship the combination with a longitudinal box body; of two horizontal planes extending from each side of the center of said body, a main shaft running centrally through said body, propellers mounted upon said shaft at the front and rear of said body, a source of power, rudders at the front and rear of said body and automatic means for governing said rudders.

12. In an airship the combination with a longitudinal box body; of two horizontal planes extending from each side of the center of said body, a main shaft provided at its ends with ball and socket joints and running centrally through said body, propellers mounted upon said shaft at the front and rear of said body, a source of power, box rudders mounted on said ball and socket joints at each end of said main shaft and automatic means for governing said rudders.

13. In an airship the combination with a longitudinal box body; of two horizontal planes extending from each side of the center of said body, a main shaft running centrally through said body, a bearing member rotatably mounted at the center of said main shaft, a vertical shaft supported by said bearing member, a helicopter propeller mounted upon said vertical shaft, propellers mounted upon said main shaft, a source of power, rudders at the front and rear of said box body and automatic means for governing said rudders.

14. In an airship the combination with a longitudinal box body; of two horizontal planes extending from each side of the center of said body, a main shaft running centrally through said body, a bearing member rotatably mounted at the center of said main shaft, a vertical shaft supported by said bearing member, a helicopter propeller mounted upon said vertical shaft, screw propellers, a source of power, transverse shafts rotatably supported by said bearing member one at each side of said bearing member, plano rudders mounted on the outer ends of said transverse shafts, box rudders mounted in ball and socket joints at each end of said main shaft and automatic means for operating said plano and box rudders.

15. In an airship the combination with a longitudinal box body of one or more horizontal planes extending from each side of the center of said body, a main shaft running centrally through said body, a bearing member rotatably mounted at the center of said shaft, a vertical shaft supported by said bearing member, a helicopter propeller mounted upon said vertical shaft, screw propellers, a source of power, transverse shafts rotatably supported by said bearing member, one at each side of said bearing member, plano rudders mounted on the outer ends of said transverse shafts, box rudders mounted in ball and socket joints at each end of said main shaft, automatic means for operating said plano and said box rudders, and manual means for operating said plano rudders independent of said automatic means.

16. In an airship the combination with a longitudinal box body; of two horizontal planes extending from each side of the center of said body, a main shaft running centrally through said body, a bearing member rotatably mounted at the center of said main shaft, a vertical shaft supported by said bearing member, a helicopter propeller mounted upon said vertical shaft, propellers mounted upon said main shaft, a source of power, transverse shafts ratatably supported by said bearing member, a rigid lever secured to each of said transverse shafts, a rotatable lever mounted on each of said transverse shafts, a bent lever rotatably mounted on said rigid lever having its upper end engageable with the hub of said rotatable lever, plano rudders mounted on the outer ends of said transverse shafts, box rudders universally mounted at each end of said main shaft and automatic means for governing said plano and box rudders.

17. In an airship the combination with a longitudinal box body; of two horizontal planes extending from each side of the center of said body, a main shaft running centrally through said body, a bearing member rotatably mounted at the center of said main shaft, a vertical shaft supported by said bearing member, a helicopter propeller mounted on said vertical shaft, propellers mounted upon said main shaft, a source of power, transverse shafts rotatably supported by said bearing member, a rigid lever secured to each of said transverse shafts, a rotatable lever mounted upon each of said transverse shafts, a bent lever rotatably mounted upon said rigid lever and having its upper end engageable with the hub of said rotatable lever means for moving said bent lever into and out of engagement with said rotatable lever, plano rudders mounted on the outer ends of said transverse shafts, box rudders universally mounted at each end of said main shaft and automatic means for operating said plano and box rudders.

18. In an airship the combination with a longitudinal box body; of two horizontal planes extending from each side of the center of said body, a main shaft running centrally through said body, a bearing member rotatably mounted at the center of said main shaft, a vertical shaft supported by said bearing member, a helicopter propeller mounted on said vertical shaft, propellers mounted upon said main shaft, a source of power, transverse shafts rotatably supported by said bearing member, a rigid lever secured to each of said transverse shafts, a rotatable lever mounted upon each of said transverse shafts, a bent lever rotatably mounted upon said rigid lever and having its upper end engageable with the hub of said rotatable member, a lever sleeve secured to the bottom end of each of said rigid levers, a non-rotatable shaft disposed within each of said lever sleeves, one end of each of said non-rotatable shafts engaging with the lower ends of said bent levers, the other ends being each provided with a handle, plano rudders mounted on the outer end of said transverse shafts, box rudders universally mounted at each end of said main shaft and automatic means for operating said plano and box rudders.

19. In an airship the combination with a longitudinal box body; of two horizontal planes extending from each side of the center of said body, a main shaft running centrally through said body, a bearing member rotatably mounted at the center of said main shaft, a vertical shaft supported by said bearing member, a helicopter propeller mounted on said vertical shaft, propellers mounted on said main shaft, a source of power, transverse shafts rotatably supported by said bearing member, plano rudders mounted upon said transverse shafts, a rotatable lever mounted upon each of said transverse shafts, means for detachably connecting said rotatable levers to said transverse shafts, a bearing ring rotatably mounted upon said main shaft, pivotal pins diametrically disposed in said bearing ring, a pendulum pivotally mounted upon said pivotal pins, box rudders and means connecting said pendulum with said box rudders whereby the steerage of the ship is made automatic.

20. In an airship the combination with a longitudinal box body; of one or more horizontal planes extending from each side of the center of said body, a main shaft running centrally through said body, a bearing member rotatably mounted at the center of said main shaft, a vertical shaft supported by said bearing member, a helicopter propeller mounted on said vertical shaft, propellers mounted on said main shaft, a source of power, a pendulum, means for pivotally mounting said pendulum on said main shaft, box rudders, and means connecting said pendulum with said box rudders, whereby the steerage of the ship is made automatic.

21. In an airship the combination with a longitudinal box body; of two horizontal planes extending from each side of said body, a main shaft running centrally through said body, a platform pivotally supported mediately from said main shaft, and centrally below said bearing member, a source of power mounted upon said platform, means connecting said source of power to said main shaft, screw propellers mounted on said main shaft, a bearing ring rotatably mounted on said main shaft, pivotal pins disposed diametrically in said bearing ring, a pendulum pivotally mounted upon said pivotal pins, box rudders at each end of said main shaft and means connecting said box rudders with said pendulum whereby the steerage of the ship is made automatic.

22. In an airship the combination with a longitudinal box body; of two horizontal planes extending from each side of said body, a main shaft running centrally through said body, a platform pivotally supported mediately from said main shaft and centrally below said bearing member, a source of power mounted upon said platform, means connecting said source of power to said main shaft, screw propellers mounted upon said main shaft, a vertical shaft, a helicopter propeller mounted on said vertical shaft, means connecting said vertical shaft with said source of power, a bearing ring rotatably mounted on said main shaft, pivotal pins disposed diametrically in said bearing ring, a pendulum pivotally mounted upon said pivotal pins, box rudders at each end of said main shaft and means connecting said box rudders with said pendulum whereby the steerage of the ship is made automatic.

23. In an airship the combination with a longitudinal box body; of two horizontal planes extending from each side of said body, a main shaft running centrally through said body, a platform pivotally supported mediately from said shaft, and centrally below said bearing member, a source of power mounted upon said platform, means connecting said source of power to said main shaft, screw propellers mounted on said main shaft, transverse shafts supported by said bearing member, plano rudders mounted on said transverse shafts, a bearing ring rotatably mounted on said main shaft, pivotal pins disposed diametrically in said bearing ring, a pendulum pivotally mounted upon said pivotal pins, means connecting said transverse shafts with said pivotal pins, box rudders at each end of said main shaft and means connecting said box rudders with said pendulum whereby the steerage of the ship is made automatic.

24. In an airship the combination with a longitudinal box body, of two horizontal planes extending from each side of said body, a main shaft running centrally through said body, a platform pivotally supported mediately from said main shaft and centrally below said bearing member, a source of power mounted upon said platform, means connecting said source of power to said main shaft, screw propellers mounted upon said main shaft, a vertical shaft, a helicopter propeller mounted on said vertical shaft, means connecting said vertical shaft with said source of power, transverse shafts supported by said bearing member, plano rudders mounted on said transverse shafts, a bearing ring rotatably mounted on said main shaft, pivotal pins disposed diametrically in said bearing ring, a pendulum pivotally mounted upon said pivotal pins, means connecting said transverse shafts with said pivotal pins, box rudders at each end of said main shaft, and means connecting said box rudders with said pendulum whereby the steerage of the ship is made automatic.

25. In an airship the combination with a longitudinal box body; of one or more horizontal planes extending from each side of said body, a main shaft running centrally through said body, a platform universally supported mediately from said shaft and centrally below said bearing member, a source of power mounted upon said platform, means connecting said source of power to said main shaft, screw propellers mounted on said main shaft, a bearing ring rotatably mounted on said main shaft, pivotal pins disposed diametrically in said bearing ring, a pendulum pivotally mounted upon said pivotal pins and having its lower end pivotally secured to said platform, box rudders at each end of said main shaft and means connecting said box rudders with said pendulum whereby the steerage of the ship is made automatic.

26. In an airship the combination with a longitudinal box body; of one or more horizontal planes extending from each side of said body, a main shaft running centrally through said body, a platform pivotally supported mediately from said main shaft and centrally below said bearing member, a source of power mounted upon said platform, means connecting said source of power to said main shaft, screw propellers mounted upon said main shaft, a vertical shaft, a helicopter propeller mounted on said vertical shaft, means connecting said vertical shaft with said source of power, a bearing ring rotatably mounted on said main shaft, pivotal pins disposed diametrically on said bearing ring, a pendulum pivotally mounted upon said pivot pins and having its extreme end pivotally secured to said platform, box rudders at each end of said main shaft, and means connecting said box rudders with said pendulum, whereby the steerage of the ship is made automatic.

27. In an airship the combination with a longitudinal box body; of one or more horizontal planes extending from each side of said body, a main shaft running centrally through said body, a source of power, means connecting said source of power with said main shaft, screw propellers mounted on said main shaft, box rudders, a pendulum, means for pivotally mounting said pendulum on said main shaft, automatically operated means connecting said pendulum with said box rudders, and manually operated means connecting said pendulum with said rudders and independent of said automatic means.

28. In an airship the combination with a box body; of one or more horizontal planes extending from each side of said body, a main shaft running centrally through said body, a source of power, means connecting said source of power with said main shaft, screw propellers mounted on said main shaft, box rudders, a bearing ring rotatably mounted upon said main shaft, pivotal pins disposed in said bearing ring, a pendulum mounted on said pivotal pins, means connecting said pendulum with said box rudders, and means carried by said pendulum for disconnecting said box rudders from said pendulum, whereby the steerage of the ship is automatically or manually operated.

29. In an airship the combination with a box body; of two horizontal planes extending from each side of said body, a main shaft running centrally through said body, a source of power, means connecting said source of power with said main shaft, screw propellers mounted on said main shaft, box rudders, a bearing ring rotatably mounted upon said main shaft, pivotal pins disposed in said bearing ring, a pendulum mounted on said pivotal pins, arc rods slidably disposed in said pendulum, means for engageably connecting one of said arc rods with said pendulum and means connecting said arc rods with said box rudders whereby the steerage of the ship is made automatic.

30. In an airship the combination with a longitudinal box body; of two horizontal planes extending from each side of said body, a main shaft running centrally through said body, a platform pivotally supported mediately from said main shaft, a source of power, said source of power being mounted upon said platform, means connecting said source of power with said main shaft, screw propellers mounted upon said main shaft, box rudders, a bearing ring rotatably mounted upon said main shaft, pivotal pins disposed in said bearing ring, a pendulum mounted on said pivotal pins, arc rods slidably disposed in said pendulum, means for engageably connecting one of said arc rods with said pendulum and means connecting said arc rods with said box rudders whereby the steerage of the ship is made automatic.

31. In an airship the combination with a longitudinal box body; of two horizontal planes extending from each side of said body, a main shaft running centrally through said body, a platform pivotally supported mediately from said main shaft, a source of power, said source of power being mounted upon said platform, means connecting said source of power with said main shaft, screw propellers mounted upon said main shaft, box rudders, a bearing ring rotatably mounted upon said main shaft, pivotal pins disposed in said bearing ring, a pendulum mounted on said pivotal pins, transverse shafts, plano rudders secured to the outer ends of said transverse shafts, a rotatable lever mounted upon each of said transverse shafts, means for engageably securing said rotatable levers to said transverse shafts, a sleeve rotatably and slidably mounted upon the arm of each of said rotatable levers, a pivotal pin sleeve rotatably and slidably mounted on each of said pivotal pins, a screw-threaded stud pivotally securing said sleeve and said pivotal pin sleeve, arc rods slidably disposed in said pendulum, means for engageably connecting one of said arc rods with said pendulum and means connecting said arc rods with said box rudders whereby the steerage of the ship is made automatic.

32. In an airship the combination with a longitudinal box body; of two horizontal planes extending from each side of said body, a main shaft running centrally through said body, a platform pivotally supported mediately from said main shaft, a source of power, said source of power being mounted upon said platform, means connecting said source of power with said main shaft, screw propellers mounted upon said main shaft, box rudders, a bearing ring rotatably mounted upon said main shaft, pivotal pins disposed in said bearing ring, a pendulum mounted on said pivotal pins, arc rods slidably disposed in said pendulum, means for engageably connecting one of said arc rods with said pendulum, frames disposed around said main shaft, wires connecting said arc rods with said frames, wires connecting said frames and wires connecting said box rudders with said frames whereby the steerage of the ship is made automatic.

33. In an airship the combination with a longitudinal box body; of two horizontal planes extending from each side of said body, a main shaft running centrally through said body, a platform pivotally supported mediately from said main shaft, a source of power, said source of power being mounted upon said platform, means connecting said source of power with said main shaft, screw propellers mounted upon said main shaft, box rudders, a bearing ring rotatably mounted upon said main shaft pivotal pins disposed in said bearing ring, a pendulum mounted on said pivotal pins, arc rods slidably disposed in said pendulum, notches cut in one of said arc rods, means held by said pendulum for detachably engaging said notched arc rods and means connecting said arc rods with said box rudders whereby the steerage of the ship is made automatic.

34. In an airship the combination with a longitudinal box body; of two horizontal planes extending from each side of said body, a main shaft running centrally through said body, a platform pivotally supported mediately from said main shaft, a source of power, said source of power being mounted upon said platform, a plurality of round belts connecting said source of power with said main shaft, screw propellers, box rudders, a bearing ring rotatably mounted upon said main shaft, pivotal pins disposed in said bearing ring, a pendulum mounted on said pivotal pins, arc rods slidably disposed in said pendulum, means for engageably connecting one of said arc rods with said pendulum and means connecting said arc rods with said box rudders whereby the steerage of the ship is made automatic.

35. In an airship the combination with a longitudinal box body; of two horizontal planes extending from each side of said body, a main shaft running centrally through said body, transverse shafts, plano rudders mounted on the outer ends of said transverse shafts, a platform pivotally supported mediately from said main shaft, a source of power mounted on said platform, means connecting said source of power with said main shaft, screw propellers, box rudders, a bearing ring rotatably mounted upon said main shaft, pivotal pins disposed in said bearing ring, a pendulum mounted on said pivotal pins, means connecting said pivotal pins to said transverse shafts, arc rods slidably disposed in said pendulum, means for engageably connecting one of said arc rods with said pendulum and means connecting said arc rods with said box rudders whereby the steerage of the ship is made automatic.

36. In an airship the combination with a longitudinal box body; of two horizontal planes extending from each side of the center of said body, a main shaft running centrally through said body, transverse shafts running parallel with said horizontal planes, plano rudders mounted on the outer ends of said transverse shafts, a platform pivotally supported mediately from said main shaft, a source of power mounted upon said platform, means connecting said source of power with said main shaft, screw propellers, box rudders, a bearing ring rotatably mounted on said main shaft, pivotal pins disposed in said bearing ring, a pendulum mounted on said pivotal pins, means connecting said transverse shafts with said pivotal pins, arc rods slidably disposed in said pendulum, means for engageably connecting one of said arc rods with said pendulum and means connecting said arc rods with said box rudders whereby the steerage of the ship is made automatic.

37. In an airship the combination with a longitudinal box body; of two horizontal planes extending from each side of the center of said body, a main shaft running centrally through said body, transverse shafts running parallel with said horizontal planes, plano rudders mounted on the outer ends of said transverse shafts, a platform pivotally supported mediately from said main shaft, a source of power mounted upon said platform, means connecting said source of power with said main shaft, screw propellers, box rudders, a bearing ring rotatably mounted on said main shaft, pivotal pins disposed in said bearing ring, a pendulum mounted on said pivotal pins, means connecting said transverse shafts with said pivotal pins, arc rods slidably disposed in said pendulum, means for engageably connecting one of said arc rods with said pendulum, frames disposed about said main shaft, wires connecting said arc rods with said frames, wires connecting said frames and wires connecting said box rudders to said frames whereby the steerage of the ship is made automatic.

38. In an airship the combination with a longitudinal box body; of two horizontal planes extending from each side of the center of said body, a main shaft running centrally through said body, transverse shafts running parallel with said horizontal planes, plano rudders mounted on the outer ends of said transverse shafts, a platform pivotally supported mediately from said main shaft, a source of power mounted upon said platform, means connecting said source of power with said main shaft, screw propellers, box rudders, a bearing ring rotatably mounted on said main shaft, pivotal pins disposed in said bearing ring, a pendulum mounted on said pivotal pins, means connecting said transverse shafts with said pivotal pins, a rotatable lever mounted upon each of said transverse shafts, means for engageably securing said rotatable levers to said transverse shafts, a sleeve rotatably and slidably mounted upon the arm of each of said rotatable levers, a pivotal pin sleeve rotatably and slidably mounted on each of said pivotal pins, a screw-threaded stud pivotally securing each of said first mentioned sleeves to the corresponding pivotal pin sleeve, arc rods slidably disposed in said pendulum, means for engageably connecting one of said arc rods with said pendulum and means connecting said arc rods with said box rudders whereby the steerage of the ship is made automatic.

39. In an airship the combination with a longitudinal box body; of two horizontal planes extending from each side of the center of said body, a main shaft running centrally through said body, transverse shafts running parallel with said horizontal planes, plano rudders mounted on the outer ends of said transverse shafts, a platform pivotally supported mediately from said main shaft, a source of power mounted upon said platform, a plurality of round belts connecting said source of power with said main shaft, screw propellers, box rudders, a bearing ring rotatably mounted on said main shaft, pivotal pins disposed in said bearing ring, a pendulum mounted upon said pivotal pins, means connecting said transverse shafts to said pivotal pins, arc rods slidably disposed in said pendulum, means for engageably connecting one of said arc rods with said pendulum and means connecting said arc rods with said box rudders whereby the steerage of the ship is made automatic.

40. The combination with an airship provided with box rudders, transverse shafts, plano rudders mounted on said transverse shafts; of a pendulum, means connecting said transverse shafts with said pendulum, frames disposed between said box rudders and said pendulum and means connecting said frames to said box rudders and to said pendulum whereby the steerage of the ship is made automatic.

41. The combination with an airship provided with box rudders and plano rudders; of a pendulum, arc rods slidably disposed in said pendulum, means for engageably securing one of said arc rods to said pendulum, frames, means connecting said box rudders to said frames and means connecting said frames to said arc rods whereby the steerage of the ship is made automatic.

42. The combination with an airship provided with box rudders and plano rudders; of a pendulum, arc rods slidably disposed in said pendulum, notches provided in one of said arc rods, means disposed in said pendulum for engageably securing said notches, frames, means connecting said box rudders to said frames and means connecting said frames to said arc rods whereby the steerage of the ship is made automatic.

In testimony whereof I have hereunto set my hand in the presence of two witnesses.

EUGENE H. KELLY.

Witnesses:
J. WM. ELLIS,
ETHEL A. KELLY.